Inventor
Darwin D. McDermott

ATTORNEYS

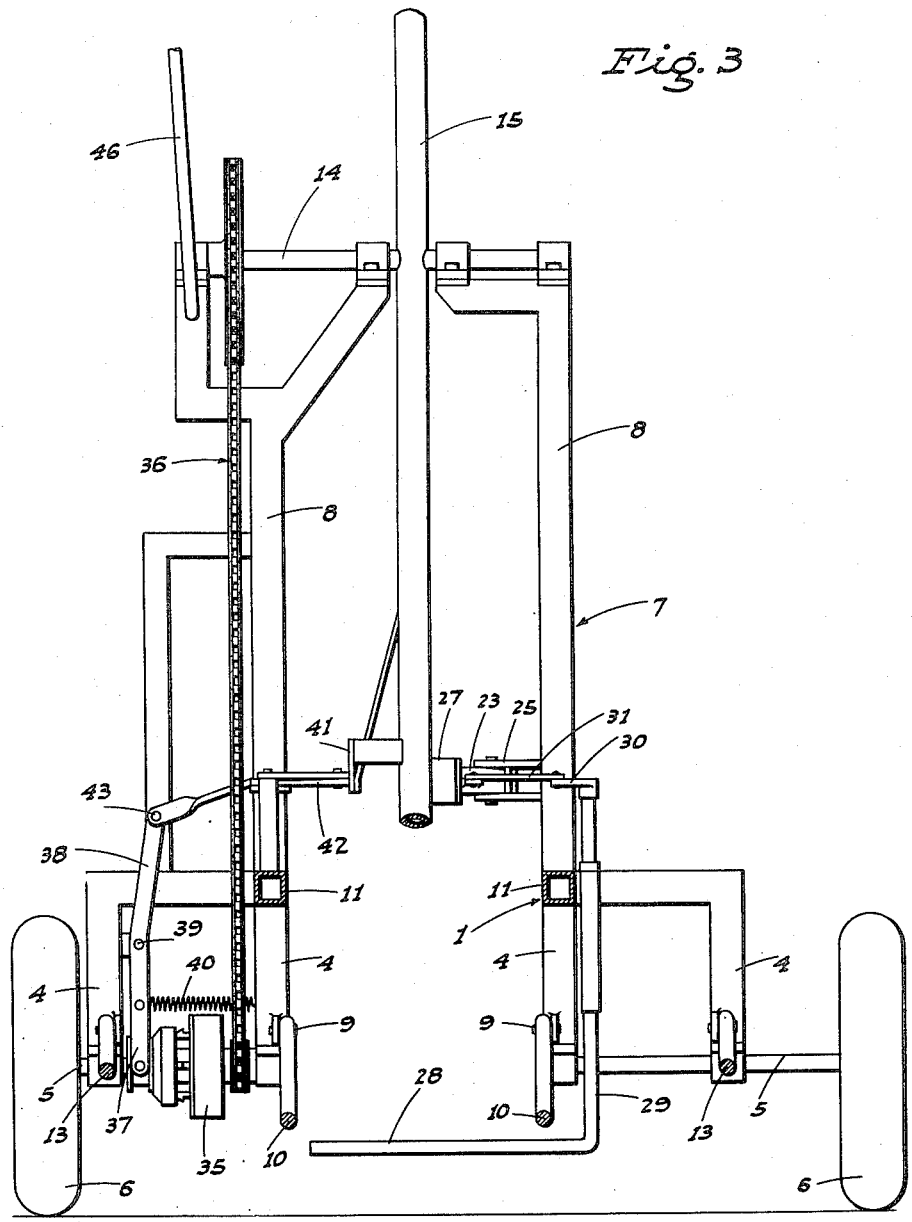

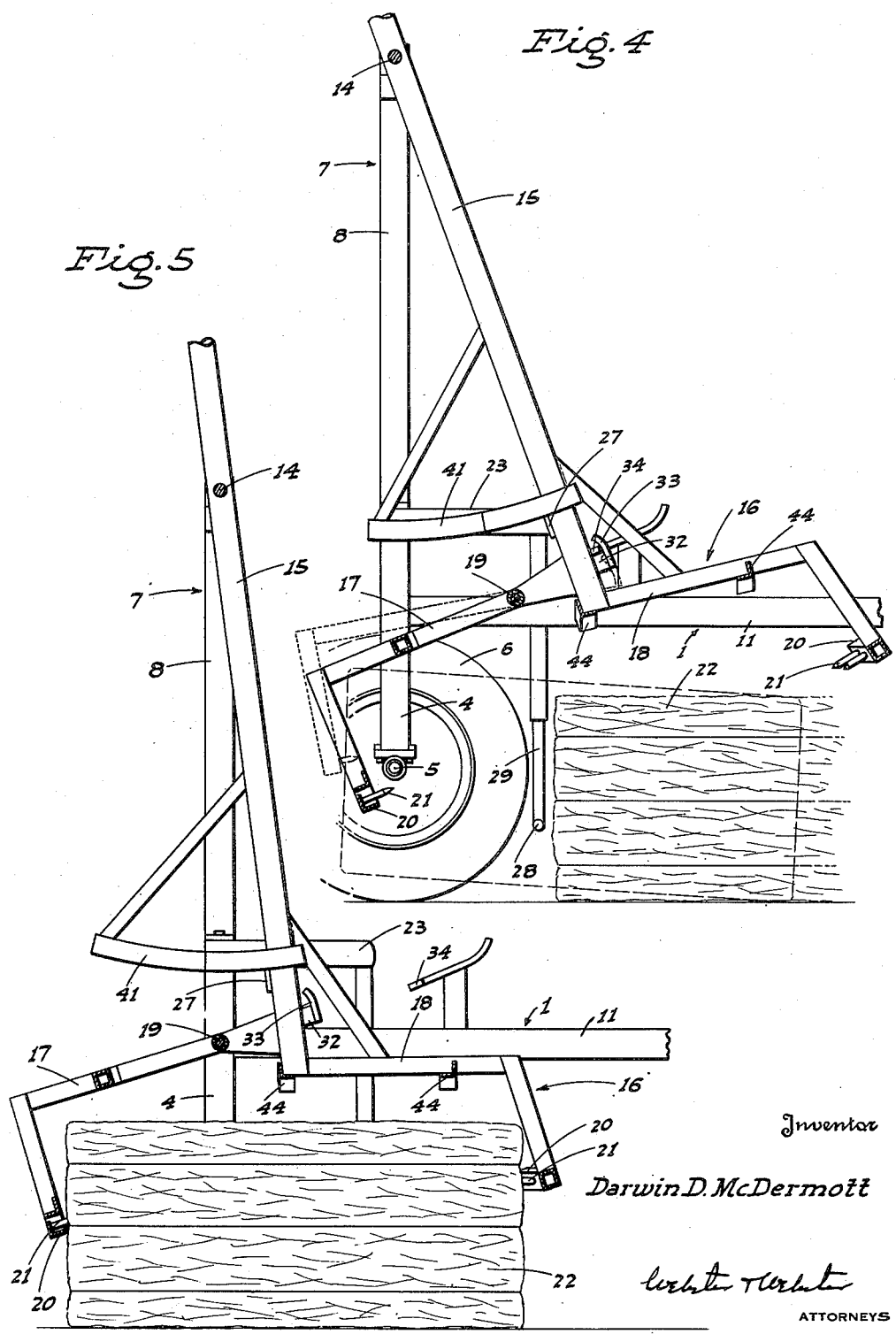

Nov. 21, 1950     D. D. McDERMOTT     2,531,070
BALED HAY LOADER

Filed Nov. 7, 1949                                5 Sheets-Sheet 5

Inventor

Darwin D. McDermott

ATTORNEYS

Patented Nov. 21, 1950

2,531,070

UNITED STATES PATENT OFFICE 2,531,070

BALED HAY LOADER

Darwin D. McDermott, San Jose, Calif.

Application November 7, 1949, Serial No. 126,027

19 Claims. (Cl. 214—147)

This invention is directed to, and it is a major object to provide, an implement which is operative—upon advance of a truck to which said implement is connected in draft relation—to engage, grip, elevate, and discharge initially ground-supported hay bales at a point above the bed of said truck whereby to facilitate loading of the latter.

Another object of the invention is to provide a baled hay loader which includes an upstanding, double-ended rotary frame supported for rotation in a longitudinal vertical plane adjacent the truck to be loaded; there being novel bale gripping units at opposite ends of said frame adapted to function, in succession, to pick up a bale from a bottom position adjacent the ground and to then swing such bale upwardly and release it at a top position higher than the truck bed.

An additional object of the invention is to provide the implement with a novel holding or stop mechanism arranged to normally maintain the assembly of the rotary frame and bale gripping units stationary until a ground supported bale is engaged by the bale gripping unit which is in bottom position, said mechanism releasing in response to such bale engagement so that the rotary frame may swing said one unit and the gripped bale to the top position for release; the rotary frame being so swung by automatically controlled driving connections actuated from a wheel driven axle of the implement.

A further object of the invention is to provide a baled hay loader, as in the preceding paragraph, wherein said driving connections include a normally disengaged clutch; there being clutch control mechanism operative, after release of the holding or stop mechanism, to cause engagement of said clutch and resultant motion of the rotary frame to swing the engaged and gripped bale from said bottom position to the top position for release at the latter, whereby the bale may be conveniently loaded onto the adjacent bed of the truck.

It is also an object of this invention to provide a baled hay loader which is designed for economy of manufacture; convenience of use; and long service, with a minimum of repair or maintenance expense.

Still another object of the invention is to provide a practical and reliable baled hay loader, and one which will be exceedingly effective for the purpose for which it is designed.

These objects are accomplished by means of such structure and relative arrangement of parts as will fully appear by a perusal of the following specification and claims.

In the drawings:

Fig. 3 is a fragmentary transverse section, somewhat diagrammatic, showing particularly the driving connections between the axle and the rotary frame.

Fig. 4 is a fragmentary longitudinal sectional elevation showing particularly one of the bale gripping units in its starting or bottom position, and before bale engagement.

Fig. 5 is a similar view, but shows the bale gripping unit after engagement with a ground supported bale.

Fig. 6 is a fragmentary cross section on line 6—6 of Fig. 1.

Figure 7:
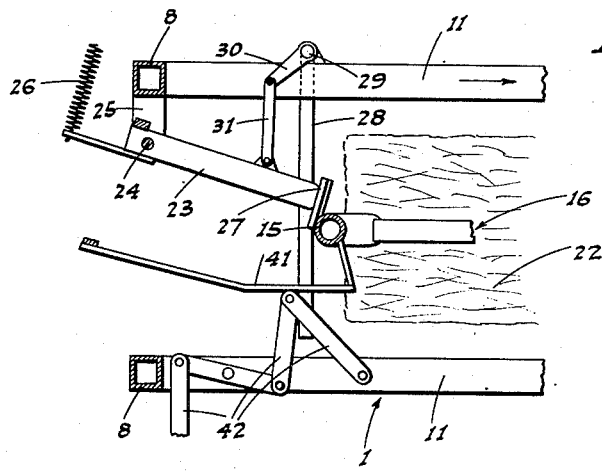
Figure 8:
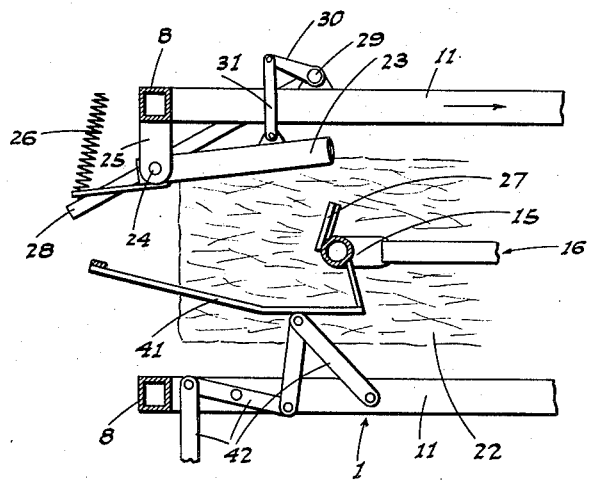
Figure 9:
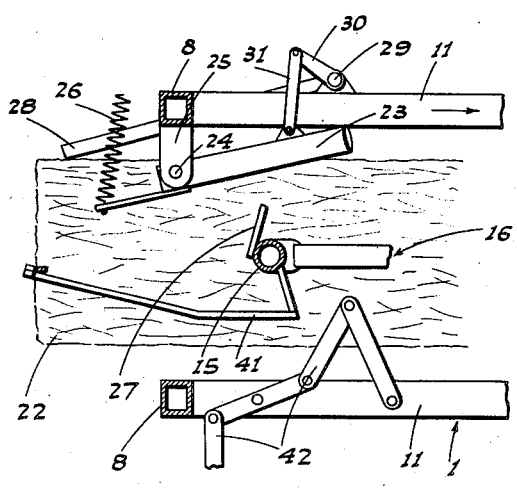

Figs. 7-9, inclusive, are fragmentary, somewhat diagrammatic plan views showing the sequential working positions of the main stop for the rotary frame, and the cam which actuates the clutch control mechanism.

Referring now more particularly to the characters of reference on the drawings, the baled hay loader comprises an elongated, rectangular main frame, indicated at 1; such main frame being of open construction and fitted, centrally at the front, with a forwardly projecting hitch 2 which is used to connect the implement in draft relation behind a vehicle for transport from place to place. However, when the implement is in use a lateral hitch 3, which projects from the main frame 1 adjacent its front end, is coupled to one side of a truck (not shown) at a point such that the implement travels alongside the truck bed.

The main frame 1 is disposed some distance above ground, and at its rear end includes relatively widely spaced depending legs 4, and axles 5 are journaled in connection with the lower ends of said legs and project outwardly therefrom. At the outer ends the axles 5 are fitted with pneumatic tire wheels 6.

At its rear end the main frame 1 is fitted with a rigid upstanding mast, indicated generally at 7, and which mast includes transversely spaced side posts 8; such side posts extending downwardly below the main frame. Adjacent their lower ends the side posts 8 are pivotally connected, as at 9, to forwardly projecting and diverging bale deflector rods 10 suspended from the corresponding side beams 11 of the frame 1 by means of chains 12.

Additionally, stabilizer rods 13 pivotally connect between the deflector rods 10, intermediate the ends of the latter, and the lower end portions of the legs 4. The purpose of the deflector rods 10 is to deflect, to proper position for engagement and pick-up, each hay bale that the implement straddles in its advance.

The mast 7 is provided at the top with a cross shaft 14, and an upstanding rotary frame 15 is fixed, centrally of its ends, to the cross shaft 14 between the side posts 8 of said mast. At each end thereof the rotary frame 15 is fitted with tong-like bale gripping units, indicated generally at 16. The bale gripping units 16, which are hereinafter described in detail, are adapted to be swung successively by the rotary frame 15 from a bottom, bale engaging and gripping position, as shown in Figs. 4 and 5, to an elevated or top position for bale release, as in Fig. 1; the bale gripping unit 16 which is in the bottom position being disposed between the side beams 11 adjacent, but spaced above the ground. The rear end of the main frame 1 is open so that said bale gripping units 16 may swing, without obstruction, between the side beams 11 of the main frame and the side posts 8 of the mast.

As the bale gripping units 16 are identical, a description of one will suffice for both.

Each bale gripping unit 16 comprises a pair of outwardly opening L-shaped jaw arms, indicated at 17, and 18; said arms being disposed in opposed relation to each other and extending in the plane of rotation of the rotary frame 15.

The arm 17 is pivoted, adjacent its inner end, in connection with the rotary frame 15, as at 19, for limited inward and outward swinging motion, while the arm 18 is fixed in connection with said rotary frame. At their free ends the L-shaped arms 17 and 18 include cross heads 20 having rows of spikes 21 thereon projecting toward each other.

When each gripping unit 16 is in its starting or bottom position, the corresponding portion of the rotary frame 15 is short of dead-center, with the result that the cross head 20 and spikes 21 on the arm 18 lie some distance above the spikes and cross head of the arm 17, and at a height greater than that of a ground-supported bale 22. Additionally, the spikes 21 corresponding to the arms 17 and 18 are initially spaced apart a distance greater than the length of a bale 22.

The rotary frame 15 is maintained in such position by releasable holding or stop mechanism, as follows:

A stop bar 23 is pivoted, at its rear end, as at 24, to a bracket 25 which projects laterally inwardly from one of the side beams 11 in generally the vertical plane of the mast; such stop bar normally extending at a forward and inward diagonal under the influence of a tension spring 26, and then engaging in abutment 27 on the rotary frame 15.

The stop bar 23 is controlled by a transversely extending trigger 28 which lies beneath the rear end portion of the main frame close to the ground; such trigger being affixed, at one end, to an upstanding shaft 29 journaled in connection with the frame and having a radial lever 30 at its upper end.

A link 31 pivotally connects between the lever 30 and the stop bar 23. As the implement advances and straddles a ground supported hay bale 22, such trigger 28 engages the bale at one end and is thus swung out of the way in the manner illustrated in Figs. 7-9, inclusive. As such trigger 28 is swung out of the way, the stop bar 23 is pulled laterally clear of the abutment plate 27 and no longer prohibits rotation of the rotary frame 15 in a clockwise direction.

However, such motion of the rotary frame 15 cannot immediately occur, for the reason that the arm 17, of the bale gripping unit 16 which is in bottom position, includes an inward extension 32 having an upstanding finger 33 which normally engages a hook 34 rigidly mounted in connection with one side beam 11; the upstanding finger 33 engaging said hook 34 by reason of the arm 17 then being swung outwardly relative to the axis of rotation (i. e. downwardly), as shown in full lines in Fig. 4. As each bale gripping unit 16 comes to bottom position, the upstanding finger 33 automatically engages the hook 34 as above, and simultaneously the stop bar 23 abuts the plate 27.

As the implement advances and straddles a ground supported hay bale 22, the stop bar 23 is first swung to clearance position, as previously described, and then the spikes 21 of the arm 17 bite into the adjacent end of said bale, causing such arm 17 to swing inwardly, relative to the axis of rotation (i. e. upwardly), which releases the finger 33 from the hook 34, with the result that the rotary frame 15 is now free to rotate.

With continued advance of the implement, with the drag of the ground-supported hay bale 22 against the arm 17, the rotary frame 15 begins to rotate clockwise, and the spikes 21 of the fixed arm 18 then bite into the adjacent end of said bale 22 (see Fig. 5).

At this time driving connections come into play, causing the rotary frame 15 to rotate clockwise through substantially a half-circle; such driving connections comprising:

A normally disengaged clutch 35 is associated with, and driven from, one axle 5 to one side of the main frame 1, and such clutch 35 is coupled, in driving relation, to the cross shaft 14, by an endless chain and sprocket unit 36.

The clutch 35 includes a shifting fork 37 on one end of a clutch control lever 38 pivoted, as at 39, for swinging motion; such clutch lever 38 normally being urged in a clutch engaging direction by a tension spring 40. However, this normally does not occur, by reason of an elongated, circumferentially extending cam 41 on the rotary frame 15 adjacent each bale gripping unit 16; each such cam 41, when the corresponding unit 16 is in its starting or bottom position, bearing against frame-mounted, movable linkage 42 which is connected, as at 43, to the clutch control lever 38. Each cam 41, when it is in engaging relation with the cooperating part of the linkage 42, causes the latter to shift the clutch control lever 38 to a position with the clutch 35 disengaged.

Figure 1:
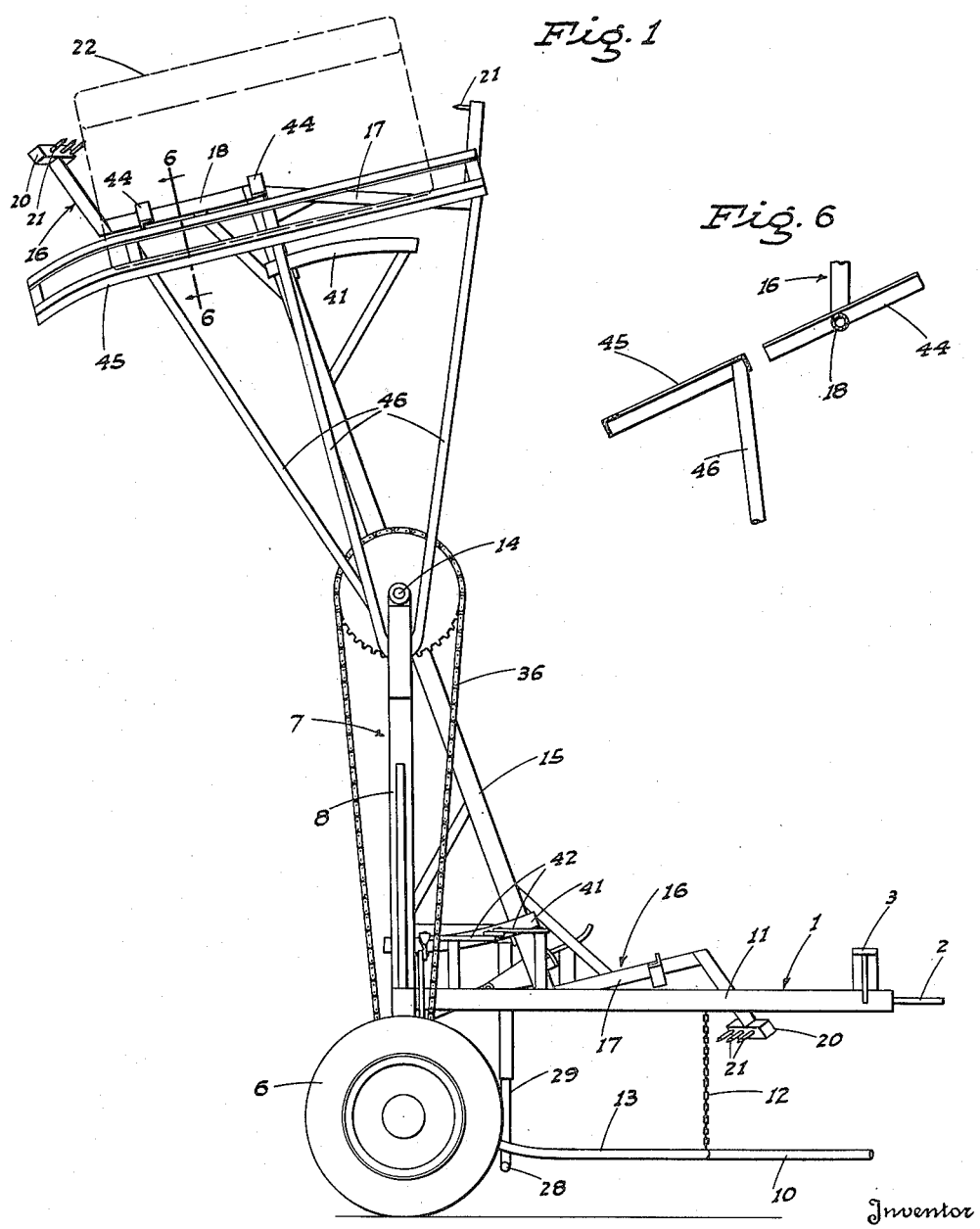
Fig. 1 is a side elevation of a baled hay loader.

When the rotary frame 15 is released from the hereinbefore described holding or stop mechanism, and initial clockwise motion of said frame occurs by reason of the lowermost gripping unit 16 engaging a ground-supported bale 22, the related cam 41 moves away from the linkage 42, whereupon the tension spring 40 acts on the clutch control lever 38 to engage the clutch 35. With such engagement said clutch 35, and the endless chain and sprocket unit 36, cause rotation of the cross shaft 14 and rotary frame 15 through substantially a half-circle; swinging the lowermost bale gripping unit 16 and the engaged hay bale 22 to an elevated or top position, as shown in Fig. 1. As said unit and bale reach the top position the clutch 35 is disengaged by reason of the next-in-place cam 41 engaging the linkage 42.

As each bale 22 is swung upwardly to the top position, as in Fig. 1, it rests on a pair of bale supporting cross bars 44 on the fixed arm 18 of the bale gripping unit 16; said bale then sliding laterally in one direction off said cross bars 44 as they are canted for this purpose. The bale 22 is readily freed from the spikes 21, especially as the arm 17 falls downwardly some distance when in the top position; such freeing also being facilitated by reason of the fact that the cross head 20 is diagonally mounted, as shown; i. e. diverges away from the adjacent end of the engaged bale in the direction of bale discharge. The tendency of the heavy bale to slide laterally down the canted cross bars 44 by gravity will frequently cause the bale to pull itself clear of the spikes 21, and in any event enables it to be easily released.

Figure 2:
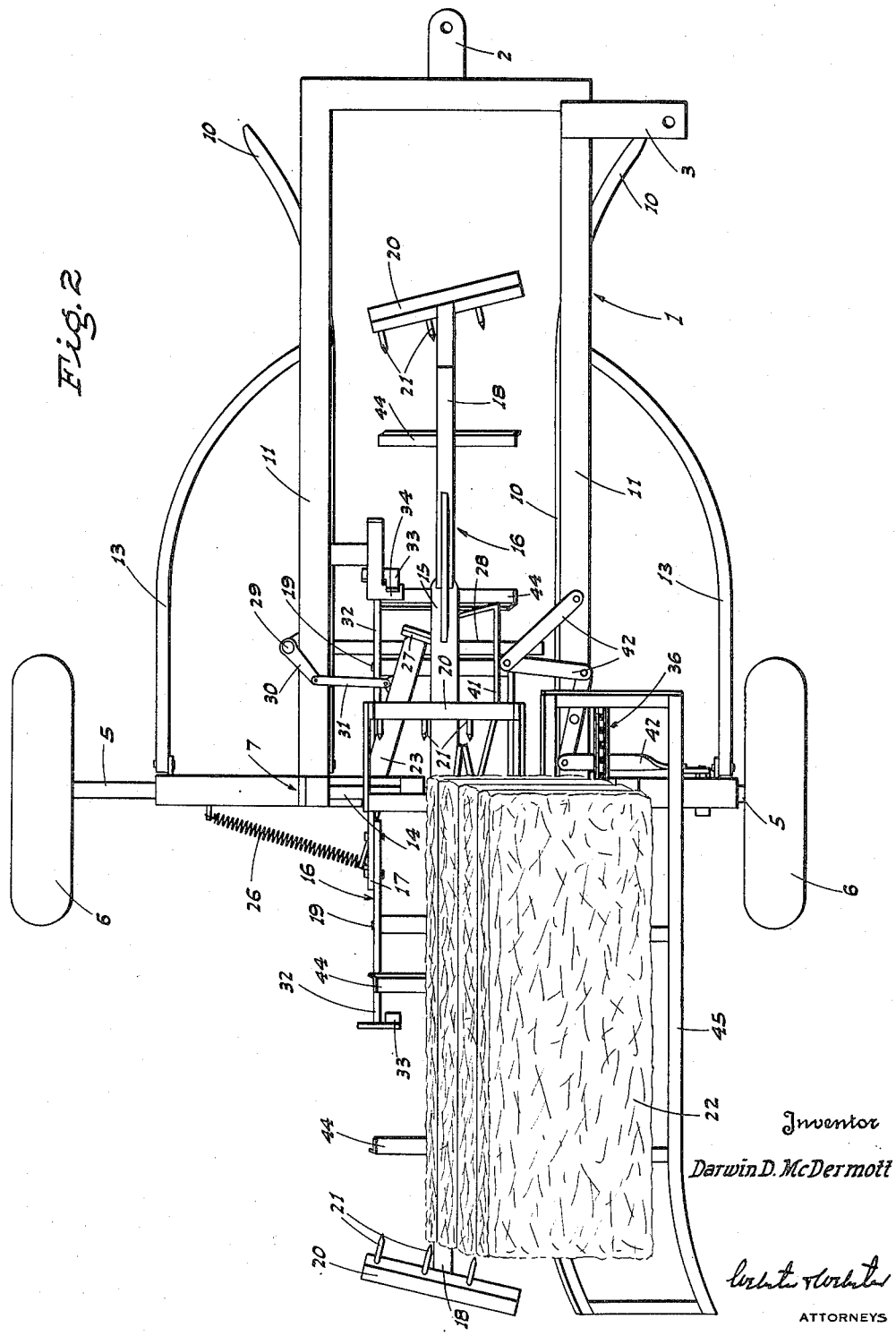
Fig. 2 is a plan view of the baled hay loader; a bale being shown at the top position, and as being released for loading onto the truck bed.

From the canted cross bars 44 a released bale 22 falls onto a bale slide structure 45 alined with said bars and mounted on rigid upstanding legs 46 which lead upwardly from the upper end of the mast 7; such bale slide structure 45 being disposed on the side toward the bed of the truck. As each bale 22 discharges from the canted cross bars 44 onto the slide structure 45 (see Fig. 2), it is hooked by a person on the bed of the truck and guided onto said bed for stacking.

With the rotary or "Ferris wheel" type frame 1, mounted as described, the bale gripping units 16 function effectively and positively to successively engage ground-supported hay bales 22, and to then grip such bales and swing them upwardly for release and discharge at a point above the bed of the truck and from which point the bales may be conveniently pulled onto the bed and stacked.

The implement thus greatly expedites the loading of baled hay and minimizes the manual effort required for the operation.

Additionally, as the controls for the holding or stop mechanism, together with the clutch, are wholly automatic, the implement does not require manual attention when in operation.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

I claim:

1. A baled hay loader comprising a main frame adapted for movement along but above the ground adjacent a vehicle having a bed, a mast on the main frame, a rotary frame journaled on the mast for rotation in a longitudinal vertical plane, a bale gripping unit on the rotary frame adapted to be swung by the latter between a bottom position adjacent the ground and a top position in a plane above the vehicle bed, the bale gripping unit in bottom position being operative to engage and grip a ground supported bale upon motion of the frame thereover, normally disengaged driving connections adapted to actuate the rotary frame to swing the bale gripping unit from bottom position to top position, said bale gripping unit when in top position being operative to release a gripped bale, and means to actuate the driving connections.

2. A baled hay loader comprising a main frame adapted for movement along but above the ground adjacent a vehicle having a bed, a mast on the main frame, a normally upstanding double-ended rotary frame journaled centrally of its ends on the mast for rotation in a longitudinal vertical plane, bale gripping units on the ends of the rotary frame normally occupying bottom and top positions respectively, the gripping unit in bottom position being operative to engage and grip a ground supported bale upon motion of the frame thereover, normally disengaged driving connections adapted to swing the rotary frame to reverse the positions of the bale gripping units, the unit reversed to top position from bottom position being operative to release a gripped bale in a plane above and for loading onto the vehicle bed, and means to actuate the driving connections.

3. A baled hay loader comprising a main frame adapted for movement along but above the ground adjacent a vehicle having a bed, a mast on the main frame, a normally upstanding double-ended rotary frame journaled centrally of its ends on the mast for rotation in a longitudinal vertical plane, bale gripping units on the ends of the rotary frame normally occupying bottom and top positions respectively, the gripping unit in bottom position being operative to engage and grip a ground supported bale upon motion of the frame thereover, normally disengaged driving connections adapted to swing the rotary frame to reverse the positions of the bale gripping units, the unit reversed to top position from bottom position being operative to release a gripped bale in a plane above and for loading onto the vehicle bed, and means to actuate the driving connections; said means being responsive to engagement with a ground supported bale of the bale gripping unit in bottom position.

4. A baled hay loader comprising a main frame adapted for movement along but above the ground adjacent a vehicle having a bed, a mast on the main frame, a normally upstanding double-ended rotary frame journaled centrally of its ends on the mast for rotation in a longitudinal vertical plane, bale gripping units on the ends of the rotary frame normally occupying bottom and top positions respectively, the gripping unit in bottom position being operative to engage and grip a ground supported bale upon motion of the frame thereover, normally disengaged driving connections adapted to swing the rotary frame to reverse the positions of the bale gripping units, the unit reversed to top position from bottom position being operative to release a gripped bale in a plane above and for loading onto the vehicle bed, and means to actuate the driving connections; there being releasable mechanism normally holding the rotary frame against unit reversing motion, and means to release said holding mechanism in timed relation to engagement with a ground supported bale of the bale gripping unit in bottom position.

5. A baled hay loader comprising a main frame adapted for movement along but above the ground adjacent a vehicle having a bed, a mast on the main frame, a normally upstanding double-ended rotary frame journaled centrally of its ends on the mast for rotation in a longitudinal vertical plane, bale gripping units on the ends of the rotary frame normally occupying bottom and top positions respectively, the gripping unit in bottom position being operative to engage and grip a ground supported bale upon motion of the frame thereover, normally disengaged driving connections adapted to swing the rotary frame to reverse the positions of the bale gripping units, the unit reversed to top position from bottom position being operative to release a gripped bale in a plane above and for loading onto the vehicle bed, and means to actuate the driving connections; there being releasable mechanism normally holding the rotary frame against unit reversing motion, and means to release said holding mechanism.

6. A baled hay loader, as in claim 5, in which both the means to actuate the driving connections, and the means to release the holding mechanism, are automatically controlled in predetermined timed relation to engagement with a ground supported bale of the bale gripping unit in bottom position.

7. A baled hay loader comprising a main frame adapted for movement along but above the ground adjacent a vehicle having a bed, a mast on the main frame, a normally upstanding double-ended rotary frame journaled centrally of its ends on the mast for rotation in a longitudinal vertical plane, bale gripping units on the ends of the rotary frame normally occupying bottom and top positions respectively, the gripping unit in bottom position being operative to engage and grip a ground supported bale upon motion of the frame thereover, normally disengaged driving connections adapted to swing the rotary frame to reverse the positions of the bale gripping units, the unit reversed to top position from bottom position being operative to release a gripped bale in a plane above and for loading onto the vehicle bed, releasable mechanism normally holding the rotary frame against unit reversing motion, means to release the holding mechanism responsive to engagement with a ground supported bale of the bale gripping unit in bottom position, and means to actuate the driving connections responsive to initial unit reversing motion of the rotary frame.

8. A baled hay loader, as in claim 7, in which said holding mechanism includes a hook assembly between the unit in bottom position and the main frame; said holding mechanism releasing means including a member on the unit in bottom position movable to disengage the hook assembly, said member being so moved in response to bale engagement.

9. A baled hay loader, as in claim 7, in which the driving connections embody a normally disengaged clutch; said last named means including a clutch control lever, a cam on the rotary frame corresponding to each bale gripping unit, and cam engaged and actuated mechanism coupled to said clutch control lever.

10. A baled hay loader comprising a main frame adapted for movement along but above the ground adjacent a vehicle having a bed, a mast on the main frame, a normally upstanding double-ended rotary frame journaled centrally of its ends on the mast for rotation in a longitudinal vertical plane, bale gripping units on the ends of the rotary frame normally occupying bottom and top positions respectively, the gripping unit in bottom position being operative to engage and grip a ground supported bale upon motion of the frame thereover, normally disengaged driving connections adapted to swing the rotary frame to reverse the positions of the bale gripping units, the unit reversed to top position from bottom position being operative to release a gripped bale in a plane above and for loading onto the vehicle bed, a movable stop projecting from the main frame in a normal position to engage and prevent unit reversing motion of the rotary frame, means including a trigger responsive to engagement with a ground supported bale operative to move the stop clear of the rotary frame, and other means responsive to initial unit reversing motion of the rotary frame operative to actuate said driving connections.

11. A baled hay loader comprising a main frame adapted for movement along but above the ground adjacent a vehicle having a bed, a mast on the main frame, a normally upstanding double-ended rotary frame journaled centrally of its ends on the mast for rotation in a longitudinal vertical plane, bale gripping units on the ends of the rotary frame normally occupying bottom and top positions respectively, each bale gripping unit including longitudinally opposed jaw arms having spikes on their ends projecting toward each other, the gripping unit in bottom position being operative to engage and grip a ground supported bale upon motion of the frame thereover, normally disengaged driving connections adapted to swing the rotary frame to reverse the positions of the bale gripping units, the unit reversed to top position from bottom position being operative to release a gripped bale in a plane above and for loading onto the vehicle bed, and means to actuate the driving connections.

12. A baled hay loader comprising a main frame adapted for movement along but above the ground adjacent a vehicle having a bed, a mast on the main frame, a normally upstanding double-ended rotary frame journaled centrally of its ends on the mast for rotation in a longitudinal vertical plane, bale gripping units on the ends of the rotary frame normally occupying bottom and top positions respectively, each bale gripping unit including longitudinally opposed jaw arms having spikes on their ends projecting toward each other, said jaw arms being relatively articulated for approaching motion to grip a bale therebetween, the gripping unit in bottom position being operative to engage and grip a ground supported bale upon motion of the frame thereover, normally disengaged driving connections adapted to swing the rotary frame to reverse the positions of the bale gripping units, the unit reversed to top position from bottom position being operative to release a gripped bale in a plane above and for loading onto the vehicle bed, and means to actuate the driving connections.

13. A baled hay loader comprising a main frame adapted for movement along but above the ground adjacent a vehicle having a bed, a mast on the main frame, a normally upstanding double-ended rotary frame journaled centrally of its ends on the mast for rotation in a longitudinal vertical plane, bale gripping units on the ends of the rotary frame normally occupying bottom and top positions respectively, each bale gripping unit including longitudinally opposed jaw arms having spikes on their ends projecting toward each other, said jaw arms being relatively articulated for approaching motion to grip a bale therebetween, the gripping unit in bottom position being operative to engage and grip a ground supported bale upon motion of the frame thereover, normally disengaged driving connections adapted to swing the rotary frame to reverse the positions of the bale gripping units, the unit reversed to top position from bottom position being operative to release a gripped bale in a plane above and for loading onto the vehicle bed, releasable mechanism normally holding the rotary frame against unit reversing motion, means to release the holding mechanism responsive to engagement of a ground supported bale with the bale gripping unit in bottom position, and means to actuate the driving connections responsive to release of the holding mechanism and initial unit reversing motion of the rotary frame resulting from bale engagement by said unit in bottom position.

14. A baled hay loader comprising a main frame adapted for movement along but above the ground adjacent a vehicle having a bed, a mast on the main frame, a normally upstanding double-ended rotary frame journaled centrally of its ends on the mast for rotation in a longitudinal vertical plane, bale gripping units on the ends of the rotary frame normally occupying bottom and top positions respectively, each bale gripping unit including longitudinally opposed radially outwardly opening generally L-shaped jaw arms having spikes on their extremities projecting toward each other, said jaws being relatively articulated for approaching motion when in bottom position to grip a bale therebetween and for separating motion when in top position to release the gripped bale, the jaw arms of the unit in bottom position gripping a bale therebetween upon motion of the frame over said bale, normally disengaged driving connections adapted to swing the rotary frame to reverse the positions of the bale gripping units, and means to actuate the driving connections.

15. A baled hay loader, as in claim 14, including releasable mechanism normally holding the rotary frame against unit reversing motion; said rotary frame then being in a position which disposes the jaw arms of the bale gripping unit in bottom position, with the spikes of the foremost arm above the spikes of the other arm whereby, as the frame advances, a ground supported bale moves relatively under said unit and is first engaged by the spikes of said other arm, and means to then release the holding mechanism so that upon the initiation of said motion of the rotary frame, the spikes of said one arm engage the adjacent end of the bale.

16. A baled hay loader, as in claim 15, in which said foremost arm is rigidly secured to the rotary frame, and the other arm is pivoted for swinging in a radial plane and occupies a lowered position when the corresponding bale gripping unit is in bottom position preparatory to bale engagement, said holding mechanism being automatically released upon bale engagement by the spikes of said other arm and resultant upward swinging of the latter.

17. A baled hay loader comprising a main frame adapted for movement along but above the ground adjacent a vehicle having a bed, a mast on the main frame, a normally upstanding double-ended rotary frame journaled centrally of its ends on the mast for rotation in a longitudinal vertical plane, bale gripping units on the ends of the rotary frame normally occupying bottom and top positions respectively, the gripping unit in bottom position being operative to engage and grip a ground supported bale upon motion of the frame thereover, normally disengaged driving connections adapted to swing the rotary frame to reverse the positions of the bale gripping units, the unit reversed to top position from bottom position being operative to release a gripped bale in a plane above and for loading onto the vehicle bed, a bale slide structure rigidly mounted above and supported by the mast in position to receive a bale discharged from a bale gripping unit at top position, and means to actuate the driving connections.

18. A baled hay loader, as in claim 17, in which the slide structure is disposed alongside said top position at an outward and downward incline; each bale-gripping unit including bale supporting cross bars which are correspondingly inclined and substantially aline with the bale slide structure when the unit is in top position.

19. A baled hay loader comprising a main frame adapted for movement along but above the ground adjacent a vehicle having a bed, a mast on the main frame, a normally upstanding double-ended rotary frame journaled centrally of its ends on the mast for rotation in a longitudinal vertical plane, bale gripping units on the ends of the rotary frame normally occupying bottom and top positions respectively, the gripping unit in bottom position being operative to engage and grip a ground supported bale upon motion of the frame thereover, normally disengaged driving connections adapted to swing the rotary frame to reverse the positions of the bale gripping units, the unit reversed to top position from bottom position being operative to release a gripped bale in a plane above and for loading onto the vehicle bed, the driving connections including a clutch, a clutch control lever, shifting mechanism adapted for cam actuation connected to said lever, and a cam on the rotary frame corresponding to each bale gripping unit, each cam when in bottom position actuating said mechanism and lever to hold the clutch disengaged, and said cam escaping said mechanism and the clutch engaging upon initial motion of the rotary frame resulting from bale engagement by the unit in bottom position.

DARWIN D. McDERMOTT.

No references cited.